(12) United States Patent
Wang et al.

(10) Patent No.: US 8,179,704 B2
(45) Date of Patent: May 15, 2012

(54) ELECTRONIC DEVICE HAVING A CIRCUIT PROTECTION UNIT

(75) Inventors: Ryan Wang, Shanhua Township (TW);
Po-Jen Su, Shanhua Township (TW)

(73) Assignee: Genesis Photonics Inc., Shanhua Township (TW)

( * ) Notice: Subject to any disclaimer, the term of this patent is extended or adjusted under 35 U.S.C. 154(b) by 401 days.

(21) Appl. No.: 12/583,349

(22) Filed: Aug. 18, 2009

(65) Prior Publication Data

US 2010/0165677 A1    Jul. 1, 2010

(30) Foreign Application Priority Data

Dec. 31, 2008   (TW) ................................ 97151663 A

(51) Int. Cl.
*H02H 7/125* (2006.01)
(52) U.S. Cl. .......... 363/52; 315/291; 361/93.9; 323/908
(58) Field of Classification Search .................... 363/50, 363/52; 323/276, 277, 908; 315/291, 185 R, 315/224; 361/93.9
See application file for complete search history.

(56) References Cited

U.S. PATENT DOCUMENTS

| | | | | |
|---|---|---|---|---|
| 4,533,970 A | * | 8/1985 | Brown | 361/58 |
| 6,515,434 B1 | * | 2/2003 | Biebl | 315/291 |
| 7,317,287 B2 | * | 1/2008 | Blumel | 315/291 |
| 7,741,788 B2 | * | 6/2010 | Ito et al. | 315/247 |

FOREIGN PATENT DOCUMENTS

| | | |
|---|---|---|
| JP | 2000-030877 A | 1/2000 |
| JP | 2005-236646 A | 9/2005 |
| JP | 2006-040584 A | 2/2006 |
| JP | 2007-147668 A | 6/2007 |

* cited by examiner

*Primary Examiner* — Jessica Han
(74) *Attorney, Agent, or Firm* — Kilpatrick Townsend & Stockton LLP

(57) ABSTRACT

An electronic device includes a circuit protection unit providing over-current protection to a main circuit and including a series connection of first and second current limiting circuits, and a normally-open branch circuit coupled in parallel to the first current limiting circuit and operable to conduct when a voltage across the first current limiting circuit reaches a first predetermined threshold voltage not greater than an endure voltage of the first current limiting circuit. Prior to conduction of the branch circuit, the first current limiting circuit maintains a current flowing therethrough at a first limit value when a current flowing through the main circuit reaches the first limit value. Upon conduction of the branch circuit, the second current limiting circuit maintains a current flowing therethrough at a second limit value greater than the first limit value when the current flowing through the main circuit reaches the second limit value.

10 Claims, 3 Drawing Sheets

ELECTRONIC DEVICE HAVING A CIRCUIT PROTECTION UNIT

CROSS-REFERENCE TO RELATED APPLICATION

This application claims priority to Taiwanese Application No. 097151663, filed Dec. 31, 2008, the disclosure of which is incorporated herein by reference.

BACKGROUND OF THE INVENTION

1. Field of the Invention

The invention relates to an electronic device, more particularly to an electronic device with over-current protection.

2. Description of the Related Art

For a lighting device including a plurality of light emitting diodes, each light emitting diode has an endure voltage ranging from 2 volts to 4 volts. However, if a much greater voltage is applied to the lighting device, the light emitting diodes may be burned due to thermal runaway. Therefore, to ensure safe operation of the light emitting diodes, over-current protection is required for the light emitting diodes.

SUMMARY OF THE INVENTION

Therefore, an object of the present invention is to provide an electronic device having a circuit protection unit that can effectively provide over-current protection.

According to one aspect of the present invention, an electronic device comprises:

a rectifying unit adapted to be coupled to an external power source for receiving and rectifying a voltage input therefrom, and generating a rectified output;

a main circuit coupled to the rectifying unit and receiving the rectified output generated by the rectifying unit; and a circuit protection unit for providing over-current protection to the main circuit such that a current flowing through the main circuit does not exceed a threshold current value, the circuit protection unit including a series connection of first and second current limiting circuits coupled to the main circuit, each of the first and second current limiting circuits having a respective endure voltage, the first current limiting circuit being operable to maintain a current flowing therethrough at a first limit value when the current flowing through the main circuit reaches the first limit value, the second current limiting circuit being operable to maintain a current flowing therethrough at a second limit value that is greater than the first limit value when the current flowing through the main circuit reaches the second limit value, and a normally-open first branch circuit coupled in parallel to the first current limiting circuit, and operable to conduct when a voltage across the first current limiting circuit reaches a first predetermined threshold voltage that is not greater than the endure voltage of the first current limiting circuit.

The first limit value serves as the threshold current value prior to conduction of the first branch circuit. The second limit value serves as the threshold current value upon conduction of the branch circuit.

According to another aspect of the present invention, there is provided a circuit protection unit adapted for providing over-current protection to a lighting device including a series connection of light emitting diodes such that a current flowing through the series connection of the light emitting diodes of the lighting device does not exceed a threshold current value. The circuit protection unit comprises:

a series connection of first and second current limiting circuits adapted to be coupled to the series connection of the light emitting diodes, each of the first and second current limiting circuits having a respective endure voltage, the first current limiting circuit being operable to maintain a current flowing therethrough at a first limit value when the current flowing through the series connection of the light emitting diodes of the lighting device reaches the first limit value, the second current limiting circuit being operable to maintain a current flowing therethrough at a second limit value greater than the first limit value when the current flowing through the series connection of the light emitting diodes of the lighting device reaches the second limit value; and a normally-open first branch circuit coupled in parallel to the first current limiting circuit, and operable to conduct when a voltage across the first current limiting circuit reaches a first predetermined threshold voltage that is not greater than the endure voltage of the first current limiting circuit.

The first limit value serves as the threshold current value prior to conduction of the first branch circuit. The second limit value serves as the threshold current value upon conduction of the first branch circuit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
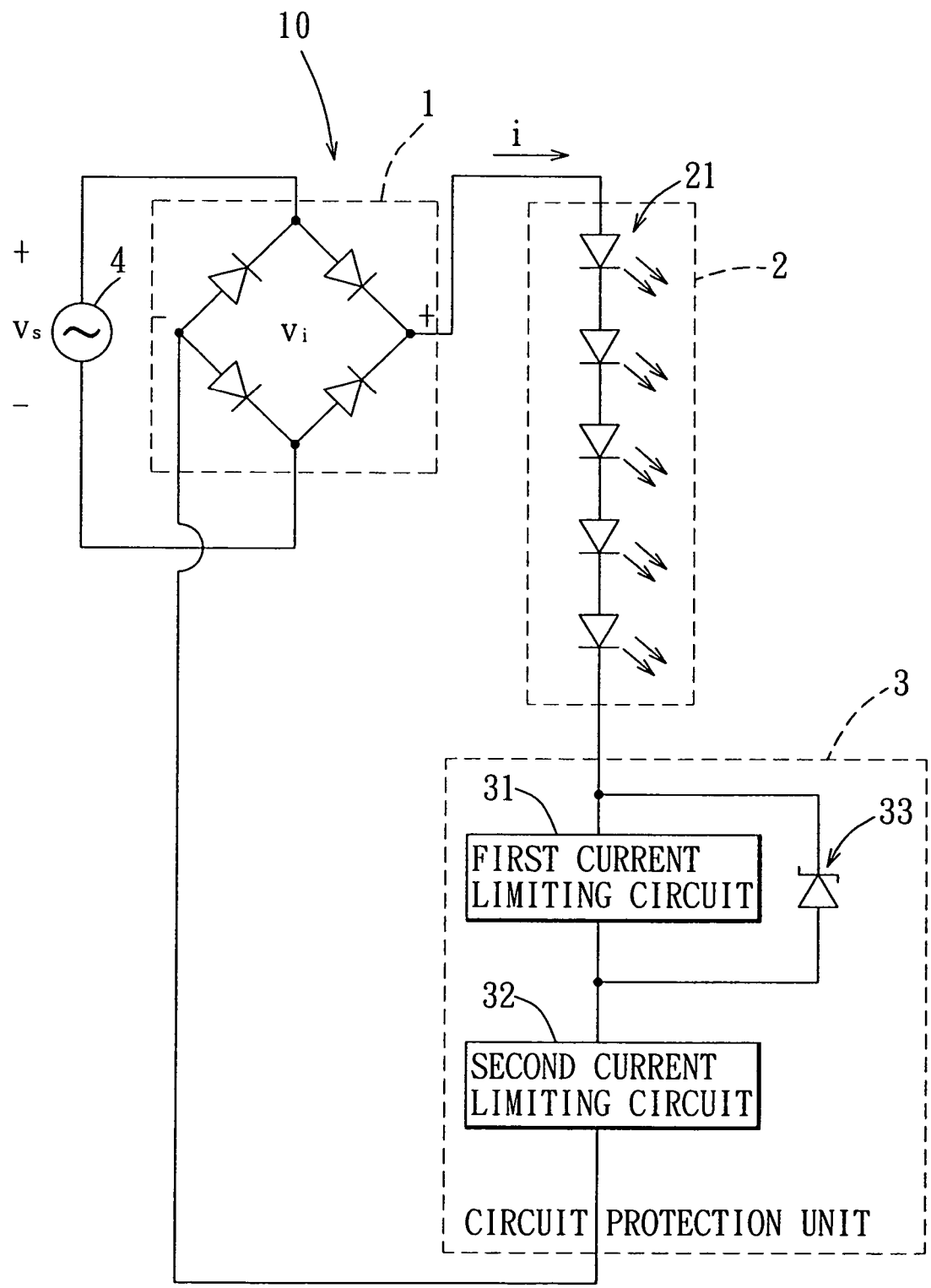
FIG. 1 is a schematic circuit block diagram illustrating the first preferred embodiment of an electronic device according to the present invention.

Before the present invention is described in greater detail, it should be noted that like elements are denoted by the same reference numerals throughout the disclosure.

Figure 2A:
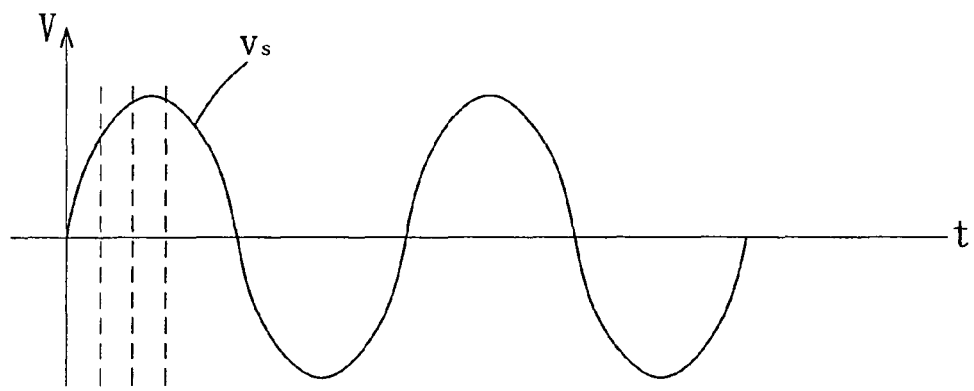
FIG. 2a illustrates a waveform of an AC voltage input ($v_s$) from an external power source.

Referring to FIG. 1, the first preferred embodiment of an electronic device 10 according to the present invention is shown to include a rectifying unit 1, a main circuit 2, and a circuit protection unit 3. In this embodiment, the electronic device 10 is a lighting device that is adapted to receive an AC voltage input ($v_s$) from an external power source 4. The AC voltage input ($v_s$) is a sine wave signal, as shown in FIG. 2a.

Figure 2B:
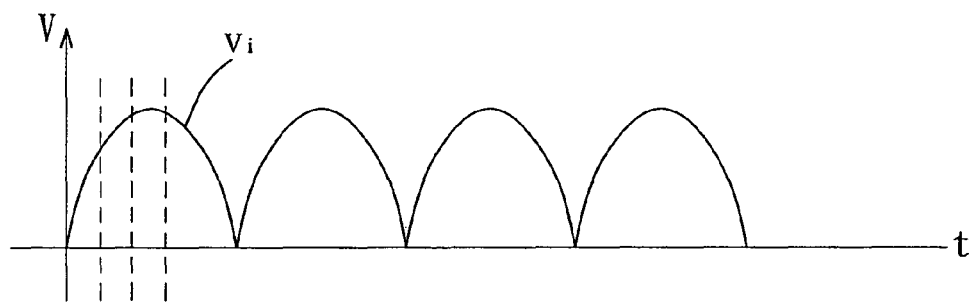
FIG. 2b illustrates a waveform of a rectified output ($v_i$) generated by a rectifying unit of the first preferred embodiment.

The rectifying unit 1 is a full-wave rectifier, such as a Wheatstone bridge, in this embodiment, and is adapted to be coupled to the external power source 4 for receiving and rectifying the AC voltage input ($v_s$) therefrom, and generates a rectified output ($v_i$), as shown in FIG. 2b. In other embodiments, the rectifying unit 1 can be a half-wave rectifier.

The main circuit 2 includes a series connection of light emitting diodes 21 in this embodiment, is coupled to the rectifying unit 1, and receives the rectified output ($v_i$) generated by the rectifying unit 1 such that the light emitting diodes 21 are activated to emit light in accordance with the rectified output ($v_r$).

The circuit protection unit 3 provides over-current protection to the main circuit 2 such that a current (i) flowing through the main circuit 2 does not exceed a threshold current value. In this embodiment, the circuit protection unit 3 includes a series connection of first and second current limiting circuits 31, 32 coupled to the main circuit 2, and a normally-open first branch circuit 33 coupled in parallel to the first current limiting circuit 31.

The first current limiting circuit 31 is coupled between the main circuit 2 and the second current limiting circuit 32 in this embodiment. Each of the first and second current limiting circuits 31, 32 has a respective endure voltage. The first current limiting circuit 31 is operable to maintain a current flowing therethrough at a first limit value (I1) when the current (i) flowing through the main circuit 2 reaches the first limit value (I1). The second current limiting circuit 32 is operable to maintain a current flowing therethrough at a second limit value (I2) greater than the first limit value (I1), i.e., I2>I1, when the current (i) flowing through the main circuit 2 reaches the second limit value (I2).

The first branch circuit 33 includes a Zener diode in this embodiment, and is operable to conduct when a voltage across the first current limiting circuit 31 reaches a first predetermined threshold voltage, i.e., a breakdown voltage of the Zener diode, that is not greater than the endure voltage of the first current limiting circuit 31. Preferably, in this embodiment, the breakdown voltage of the Zener diode is substantially equal to the endure voltage of the first current limiting circuit 31.

Figure 2C:
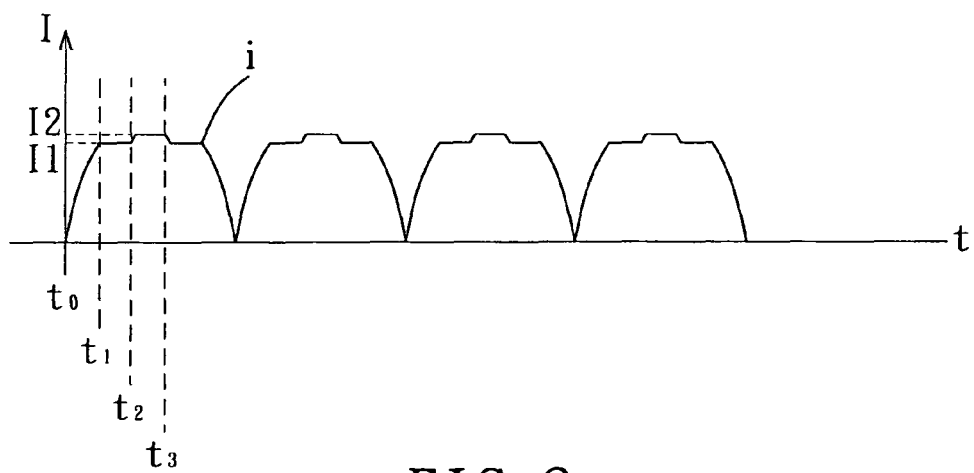
FIG. 2c illustrates a waveform of a current flowing through a main circuit of the first preferred embodiment.

In operation, referring to FIG. 2c, during a period from $t_0$ to $t_1$, the current (i) flowing through the main circuit 2 gradually increases to the first limit value (I1). During a period from $t_1$ to $t_2$, the first current limiting circuit 31 is operable to maintain the current flowing therethrough at the first limit value by increasing an impedance thereof. In this case, the voltage across the first current limiting circuit 31 gradually increases to the first predetermined threshold voltage, i.e., the breakdown voltage of the Zener diode. Therefore, the first limit value (I1) serves as the threshold current value during a period from $t_0$ to $t_2$ prior to conduction of the first branch circuit 33. The first branch circuit 33 is operable to conduct when the voltage across the first current limiting circuit 31 reaches the first predetermined threshold voltage at $t_2$ such that the current (i) flowing through the main circuit 2 fast increases from the first limit value (I1) until the current flowing through the second current limiting circuit 32 reaches the second limit value (I2). Thus, during a period from $t_2$ to $t_3$, the second current limiting circuit 32 is operable to maintain the current flowing therethrough at the second limit value (I2). Therefore, the second limit value (I2) serves as the threshold current value during the period from $t_2$ to $t_3$ after conduction of the first branch circuit 33.

Figure 3:
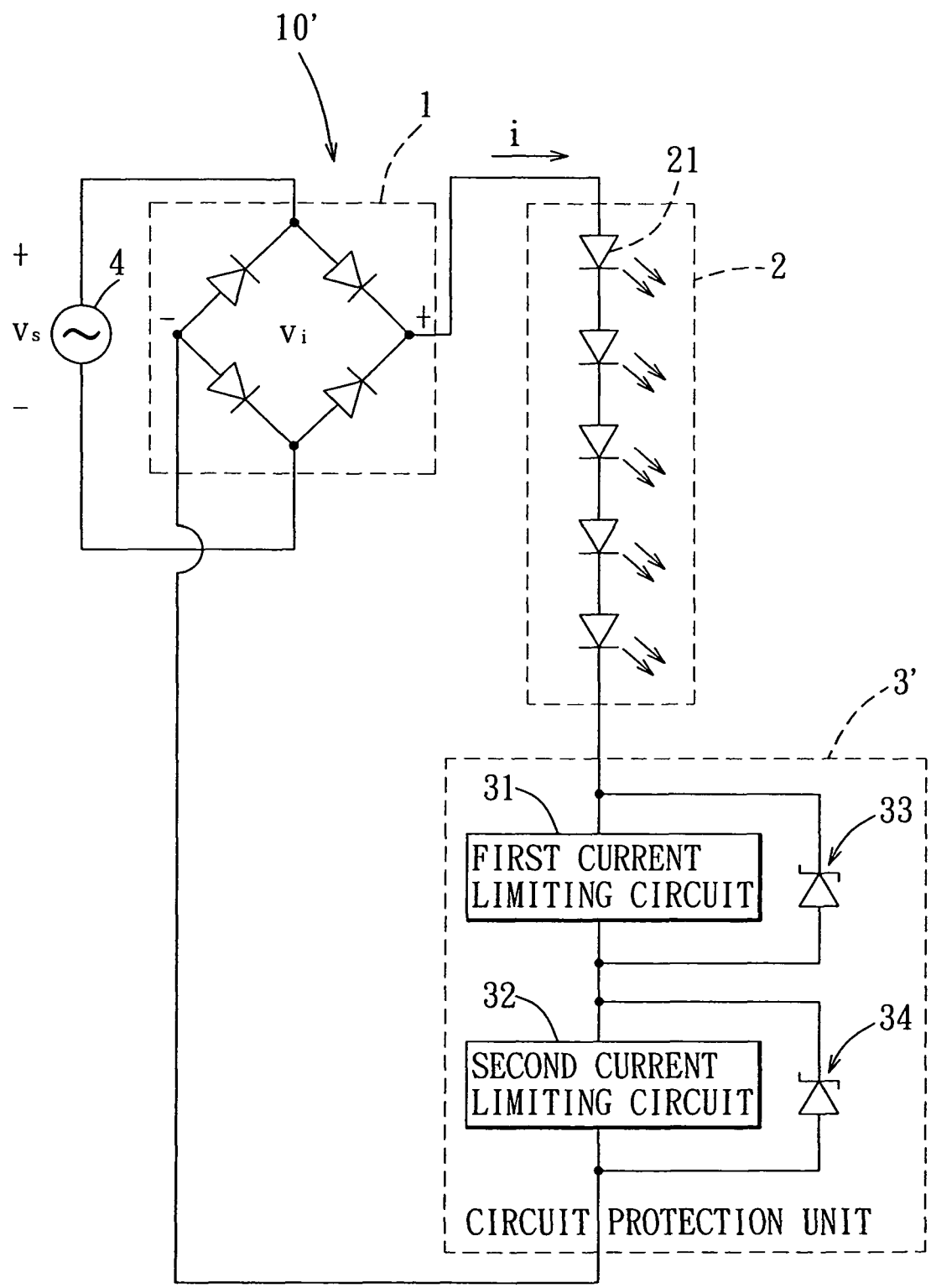
FIG. 3 is a schematic circuit block diagram illustrating the second preferred embodiment of an electronic device according to the present invention.

FIG. 3 illustrates the second preferred embodiment of an electronic device 10' according to this invention, which is a modification of the first preferred embodiment. In this embodiment, the circuit protection unit 3' further includes a normally-open second branch circuit 34, such as a Zener diode, coupled in parallel to the second current limiting circuit 32 and having a second predetermined threshold voltage, i.e., a breakdown voltage of the Zener diode, that is not greater than the endure voltage of the second current limiting circuit 32.

It is noted that the circuit protection unit 3, 3' is not limited to having the first and second current limiting circuits 31, 32 connected in series to each other. In other embodiments, the circuit protection unit 3, 3' can include more than two current limiting circuits coupled in series to each other for over-current protection.

In sum, due to the presence of the circuit protection unit 3, 3', the electronic device 10, 10' of the present invention can effectively avoid damage to the light emitting diodes 21 of the main circuit 2 due to over-current, thereby ensuring safe operation of the main circuit 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
a rectifying unit adapted to be coupled to an external power source for receiving and rectifying a voltage input therefrom, and generating a rectified output;
a main circuit coupled to said rectifying unit and receiving the rectified output generated by said rectifying unit; and
a circuit protection unit for providing over-current protection to said main circuit such that a current flowing through said main circuit does not exceed a threshold current value, said circuit protection unit including
a series connection of first and second current limiting circuits coupled to said main circuit, each of said first and second current limiting circuits having a respective endure voltage, said first current limiting circuit being operable to maintain a current flowing therethrough at a first limit value when the current flowing through said main circuit reaches the first limit value, said second current limiting circuit being operable to maintain a current flowing therethrough at a second limit value that is greater than the first limit value when the current flowing through said main circuit reaches the second limit value, and
a normally-open first branch circuit coupled in parallel to said first current limiting circuit, and operable to conduct when a voltage across said first current limiting circuit reaches a first predetermined threshold voltage that is not greater than the endure voltage of said first current limiting circuit;
wherein the first limit value serves as the threshold current value prior to conduction of said first branch circuit, and the second limit value serves as the threshold current value after conduction of said first branch circuit.

2. The electronic device as claimed in claim 1, wherein said first branch circuit includes a Zener diode having a breakdown voltage that serves as the first predetermined threshold voltage.

3. The electronic device as claimed in claim 1, wherein said rectifying unit includes a full-wave rectifier.

4. The electronic device as claimed in claim 3, wherein said full-wave rectifier is a Wheatstone bridge.

5. The electronic device as claimed in claim 1, wherein said main circuit includes a series connection of light emitting diodes.

6. The electronic device as claimed in claim 1, wherein said circuit protection unit further includes a normally-open second branch circuit coupled in parallel to said second current limiting circuit, and operable to conduct when a voltage across said second current limiting circuit reaches a second predetermined threshold voltage that is not greater than the endure voltage of said second current limiting circuit.

7. The electronic device as claimed in claim 6, wherein said second branch circuit includes a Zener diode having a breakdown voltage that serves as the second predetermined threshold voltage.

8. A circuit protection unit adapted for providing overcurrent protection to a lighting device including a series connection of light emitting diodes such that a current flowing through the series connection of the light emitting diodes of the lighting device does not exceed a threshold current value, said circuit protection unit comprising:
- a series connection of first and second current limiting circuits adapted to be coupled to the series connection of the light emitting diodes, each of said first and second current limiting circuits having a respective endure voltage, said first current limiting circuit being operable to maintain a current flowing therethrough at a first limit value when the current flowing through the series connection of the light emitting diodes of the lighting device reaches the first limit value, said second current limiting circuit being operable to maintain a current flowing therethrough at a second limit value greater than the first limit value when the current flowing through the series connection of the light emitting diodes of the lighting device reaches the second limit value; and
- a normally-open first branch circuit coupled in parallel to said first current limiting circuit, and operable to conduct when a voltage across said first current limiting circuit reaches a first predetermined threshold voltage that is not greater than the endure voltage of said first current limiting circuit;
- wherein the first limit value serves as the threshold current value prior to conduction of said first branch circuit, and the second limit value serves as the threshold current value upon conduction of said first branch circuit.

9. The circuit protection unit as claimed in claim 8, wherein said first branch circuit includes a Zener diode having a breakdown voltage that serves as the first predetermined threshold voltage.

10. The circuit protection unit as claimed in claim 8, further comprising a normally-open second branch circuit coupled in parallel to said second current limiting circuit, and operable to conduct when a voltage across said second current limiting circuit reaches a second predetermined threshold voltage that is not greater than the endure voltage of said second current limiting circuit.

\* \* \* \* \*